US009515777B2

(12) United States Patent
Le et al.

(10) Patent No.: US 9,515,777 B2
(45) Date of Patent: Dec. 6, 2016

(54) SNOOP VIRTUAL RECEIVER TIME

(71) Applicant: International Business Machines Corporation, Armonk, NY (US)

(72) Inventors: Franck Le, White Plains, NY (US); Erich M. Nahum, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 14/522,227

(22) Filed: Oct. 23, 2014

(65) Prior Publication Data
US 2016/0119088 A1 Apr. 28, 2016

(51) Int. Cl.
H04L 1/18 (2006.01)
H04W 24/04 (2009.01)
H04L 29/06 (2006.01)
H04L 1/16 (2006.01)
H04L 12/26 (2006.01)

(52) U.S. Cl.
CPC ............. *H04L 1/1809* (2013.01); *H04L 1/16* (2013.01); *H04L 1/1858* (2013.01); *H04L 43/0829* (2013.01); *H04L 69/16* (2013.01); *H04W 24/04* (2013.01)

(58) Field of Classification Search
None
See application file for complete search history.

(56) References Cited

U.S. PATENT DOCUMENTS 6,215,772 B1 4/2001 Verma
6,775,298 B1 8/2004 Aggarwal
(Continued)

FOREIGN PATENT DOCUMENTS

EP 1 211 864 A2 6/2002
EP 1 278 348 A1 1/2003

OTHER PUBLICATIONS

Lee et al., "A TCP Acceleration Algorithm for a Wireless Link using Rate Adaptation Based on Round-Trip-Time and Virtual Receiver Window Information", IEEE Communications Letters, vol. 13, No. 9, Sep. 2009, pp. 655-657.
(Continued)

*Primary Examiner* — Yemane Mesfin
*Assistant Examiner* — Peter Chen
(74) *Attorney, Agent, or Firm* — Scully, Scott, Murphy & Presser, P.C.; Jennifer R. Davis, Esq.

(57) ABSTRACT

A snoop receiver, method and computer program product for increasing the efficiency of TCP protocol operations at the snoop receiver by assuming there is no reordering over the wireless hop. The method performs maintaining a copy of each packet received, the copy adapted for retransmission to the receiver device on behalf of the source device and maintaining for each packet received, a virtual send time (VST) value of that packet. The VST corresponds to a virtual time the packet was sent or retransmitted to the receiver device. There is further maintained an estimate of the receiver device's time (VRT) based on acknowledgement (ACK) messages for packets received from the receiver device. Responsive to receiving an acknowledgement for a packet sent at the time VST, the method infers any lost packets and retransmits a copy of any lost packets having a VST value sent before the receiver's VRT estimate.

9 Claims, 10 Drawing Sheets

(56) References Cited

U.S. PATENT DOCUMENTS

| | | | |
|---|---|---|---|
| 2003/0035420 A1* | 2/2003 | Niu | H04L 47/10 370/389 |
| 2005/0074007 A1* | 4/2005 | Samuels | H04L 1/1887 370/392 |
| 2005/0117515 A1* | 6/2005 | Miyake | H04L 1/1874 370/231 |
| 2006/0248582 A1* | 11/2006 | Panjwani | H04L 47/10 726/13 |
| 2007/0291662 A1 | 12/2007 | Mangin et al. | |
| 2008/0002728 A1* | 1/2008 | Yoshida | H04L 47/10 370/401 |
| 2009/0067416 A1* | 3/2009 | Tavares | H04L 1/1607 370/355 |
| 2010/0011270 A1* | 1/2010 | Yamamoto | H04L 47/10 714/748 |
| 2012/0163167 A1 | 6/2012 | Dade | |
| 2013/0107699 A1 | 5/2013 | Miclea | |
| 2014/0007100 A1 | 1/2014 | Gu et al. | |
| 2014/0140342 A1 | 5/2014 | Narad | |

OTHER PUBLICATIONS

List of IBM Patents or Patent Applications Treated as Related.

* cited by examiner

FIG. 9

| | 0 | 1 | 2 | 3 | 4 | 5 | 6 | 7 | 8 | 9 | 0 | 1 | 2 | 3 | 4 | 5 | 1 | 2 |
|---|---|---|---|---|---|---|---|---|---|---|---|---|---|---|---|---|---|---|
| 1 | | S | | | | | A | | | | A | | | | | | | |
| 2 | | | S | | | | | S | | | A | | | | | | | |
| 3 | | | | S | | | | S | | | A | | | | | | | |
| 4 | | | | | S | | | | S | | A | | | | | | | |
| 5 | | | | | | | S | A | | | A | | | | | | | |

FIG. 10A

| | 0 | 1 | 2 | 3 | 4 | 5 | 6 | 7 | 8 | 9 | 0 | 1 | 2 | 3 | 4 | 5 | 1 | 2 |
|---|---|---|---|---|---|---|---|---|---|---|---|---|---|---|---|---|---|---|
| 1 | | S | | | | | A | | A | | | | | | | | | |
| 2 | | | S | | | | | | | S | | | | | | | | |
| 3 | | | | S | | | | | A | | | | | | | | | |
| 4 | | | | | | S | | | | | | | | | | | | |
| 5 | | | | | | | S | | | | | | | | | | | |

FIG. 10B

| | 0 | 1 | 2 | 3 | 4 | 5 | 6 | 7 | 8 | 9 | 0 | 1 | 2 | 3 | 4 | 5 | 1 | 2 |
|---|---|---|---|---|---|---|---|---|---|---|---|---|---|---|---|---|---|---|
| 1 | | S | | | | | A | | A | | A | | A | | | | | |
| 2 | | | S | | | | | | S | | | | S | | | | | |
| 3 | | | | S | | | | | A | | A | | A | | | | | |
| 4 | | | | | | S | | | | | | S | A | | | | | |
| 5 | | | | | | | S | | | | A | | A | | | | | |

SNOOP VIRTUAL RECEIVER TIME

GOVERNMENT CONTRACT

This invention was made with Government support under Contract No.: W911NF-06-3-0001 (1L) awarded by United States Government Army Research Office (ARO). The Government has certain rights in this invention.

FIELD OF INVENTION

The present invention relates generally to network communications systems and methods, and more particularly to systems and methods implemented at "middlebox" network nodes to increase the efficiency of network communications, and provide virtual or transparent services to client devices.

BACKGROUND

A fundamental problem in using the Transmission Control Protocol/Internet Protocol suite (TCP/IP) over wireless networks is TCP's default behavior in interpreting packet losses as a sign of network congestion. While this assumption is useful in wired networks, where packet losses are mainly caused by buffering limits in routers, it causes problems in wireless networks. This is because in wireless networks, packet losses can occur due to issues such as fading, attenuation, and collisions, problems unique to using the air as the transmission channel.

These packet losses can unnecessarily restrict performance, leaving the wireless channel under-utilized. There have thus been approaches to mitigate this problem by decoupling packet loss from congestion control, through two approaches:
1. modifying the end-host TCP protocol stack, or
2. inserting a middlebox device known as a performance-enhancing proxy (PEP) close to the wireless link.

The first approach is difficult to deploy since it relies on upgrading all the clients and all the servers that utilize the wireless link, typically an extremely difficult process due to the wide variety of mobile devices and server operating systems.

The second approach is easier to deploy, as it can be done incrementally, and transparently to the client and server.

Performance enhancing proxies (PEPs) come in many forms (link level, TCP level, HTTP proxies), but a convenient approach is at the TCP layer, as it benefits all TCP traffic (which is the bulk of the traffic on the Internet).

TCP PEPs fall into two categories: Split-TCP and Snoop-TCP. Both improve performance over wireless links, albeit in different ways, and have different advantages and disadvantages.

Split TCP terminates the TCP connection at the PEP, either explicitly (using different IP addresses and TCP port numbers), or implicitly (by using the same IP addresses and masquerading as the server to the client and as the client to the server).

Snoop TCP is an intelligent TCP-aware packet cache that monitors a TCP conversation, determines when a packet has been lost (before the original sender does), and retransmits that packet on behalf of the sender.

Snoop TCP is closer to the receiver than the sender is, this allows quicker loss recovery and thus better performance. It does not terminate TCP connections.

Snoop TCP has the following advantages:
1) It allows quicker loss recovery over the wireless link.
2) It does not violate any TCP semantics.
3) It requires fewer resources (CPU and memory/state) than Split TCP.
4) It is harder to detect, since it causes fewer changes to the TCP connection behavior.

Both Split TCP and Snoop share a significant limitation: they assume packet reordering can occur in networks, which limits performance.

That is, the TCP protocol assumes packet reordering can happen in arbitrary networks (see, for example, Internet Engineering Task Force RFCs 2001, 5681), and hence requires three (3) indications of loss (the "triple-duplicate-ACK") before the sender can retransmit a packet.

Many wireless networks however are 1-hop networks where packet reordering is not possible (e.g., WiFi, Satellite, cellular).

It would be highly desirable to increase the efficiency of TCP protocol operations at the middlebox by assuming there is no reordering over the wireless hop.

SUMMARY

The present invention provides a Snoop Virtual Receiver Timer (VRT), a form of TCP snoop receiver device, which takes advantage of a property that packet reordering does not occur in most wireless networks (e.g., WiFi, Satellite, Cellular).

According to an aspect of the disclosure, a method for communicating packets between a source device that sends packets to be received at a receiver device is provided. The method comprises: maintaining, at a processing node intermediate to the source and receiver devices, a copy of each packet received, the copy adapted for retransmission to the receiver device on behalf of the source device. Further there is maintained at the intermediate processing node, for each packet received, a value representing a virtual send time (VST) of that packet, the VST corresponding to a virtual time the packet was sent or retransmitted to the receiver device. Further there is maintained at the intermediate node, an estimate of the receiver device's time (VRT) based on acknowledgement (ACK) messages for packets received from the receiver device. Responsive to receiving an acknowledgement for a packet sent at the time VST: the method infers if there are any lost packets; and, retransmits a copy of any lost packets having a VST value sent before the receiver's VRT estimate. A programmed processor device at the intermediate processing node performs maintaining the copy, maintaining the VST value, maintaining the VRT estimate, the acknowledgement receiving, the inferring and the retransmitting.

Further to the method of the disclosure, the method at the processing node includes determining, upon the receipt of the ACK message, whether the time VST value of the acknowledged packet is greater than the VRT estimate, and if the VST value is greater than VRT estimate, updating the VRT to the VST value.

In a further aspect, there is provided a snoop receiver apparatus for a communications network having a source device and a receiver device, the source device sending packets for receipt at the receiver device, the apparatus comprising: a processor device and an associated memory, the processor device configured to perform a method. The method: maintains a copy of each packet received, the copy adapted for retransmission to the receiver device on behalf of the source device, and maintain, for each packet received, a value representing a virtual send time (VST) of that packet, the VST corresponding to a virtual time the packet was sent or retransmitted to the receiver device. The method further maintains an estimate of the receiver device's time (VRT) based on acknowledgement (ACK) messages for packets received from the receiver device. Responsive to receiving an acknowledgement for a packet sent at the time VST, the processor device is further configured to: infer any lost packets; and, retransmit a copy of any lost packets having a VST value sent before the receiver's VRT estimate.

In a further embodiment, a computer program product is provided for performing operations. The computer program product includes a storage medium readable by a processing circuit and storing instructions run by the processing circuit for running a method. The storage medium readable by a processing circuit is not only a propagating signal. The method is the same as listed above.

BRIEF DESCRIPTION OF THE DRAWINGS

FIG. 9 depicts middlebox processing of a first example by implementing the method steps of FIGS. 2-8;

FIGS. 10A and 10B each depicts further examples of middlebox processing according to the method steps of FIGS. 2-8;

DETAILED DESCRIPTION

There is described an enhancement to a Performance Enhancing Proxy (PEP), i.e., "middlebox," implemented for a wireless packet communications "snoop" TCP network. The network may be a 1-hop wireless network that safely assumes no reordering for the last hop which allows a much more accurate and efficient snoop, and is faster than the split TCP network protocol.

As described herein, an ACK in the Transmission Control protocol is the acknowledgement returned to a sender indicating a particular sequence number when the receiver has received the particular packet of a sequence. Further, as known, TCP employs a selective acknowledgment (SACK) that allows the receiver to acknowledge discontinuous blocks of packets which were received correctly. Further, TCP employs a cumulative acknowledgement (CUM ACK) that allows the receiver to acknowledge the receiver has received all data preceding the acknowledged sequence number. Further, TCP employs a duplicate acknowledgement (DUP ACK) that is sent from the receiver to indicate to the sender when the sender can retransmit a packet according to the TCP. According to the methods herein, receipt of a single duplicate ACK infers a segment (packet) is lost. Further, if a SACK (selective acknowledgement) is received for a segment (packet), it is inferred that any earlier segment is lost.

The system and methods employed at the middlebox function under the assumption that when no packet reordering occurs in a network, any information returned by the receiver is also not reordered, and that causality can be used to infer state at the receiver. Thus, when a single loss indication (such as a duplicate ACK or a SACK block in accordance with the TCP protocol) is received by the middlebox, that information can be used to determined which packets have been lost and require retransmission. In Snoop VRT, the proxy (e.g., middlebox) keeps track of a virtual time at the receiver (VRT) in a way that requires no modifications to the receiver.

As described herein, VRT is a monotonically increasing value that represents the causal dependency between sender and receiver.

The system and methods provide a solution that allows Snoop VRT processing node to more quickly retransmit packets than split TCP or snoop would, resulting in better network performance.

Figure 1:
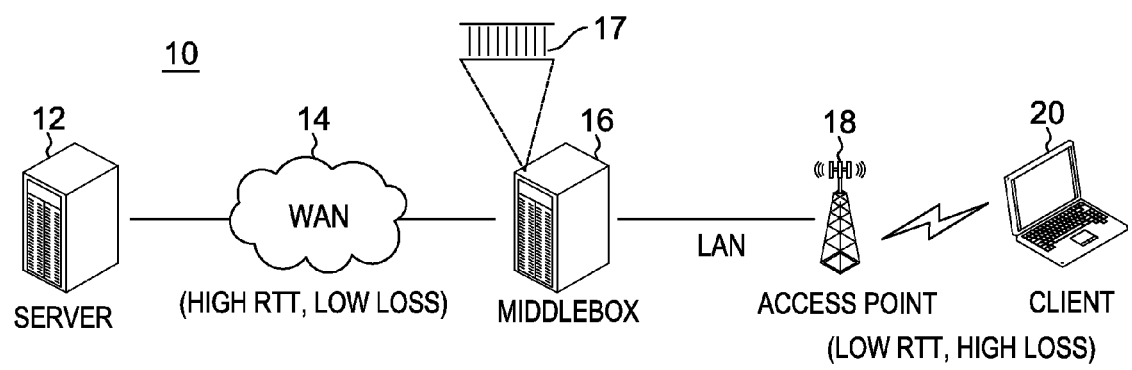
FIG. 1 is a system 10 implementing an embodiment of the snoop-VRT.

Referring to FIG. 1, an exemplary system 10 according to an embodiment comprises a communications system implementing TCP/IP packet transmission protocol and a method enhancing the TCP/IP packet transmission protocol by operating a transparent performance enhancing proxy or middlebox 16 between a source device 12 (e.g., a "sender") and a destination device 20 (e.g., a "receiver" or "client" device). A source device may include a server, e.g., a web-based server providing contents as packets destined for a receiver or client and communicated over a network such as a wide area network 14 such as the Internet. The receiver or client device 20 may include any computing device or a mobile device. Examples of the mobile device may include, but are not limited to: a tablet computer including at least one processor and at least one memory device, a netbook computer including at least one processor and at least one memory device, a smartphone including at least one processor and at least one memory device, a laptop computer including at least one processor and at least one memory device, a device dedicated to web-browsing, or a wearable computer, e.g., smartwatch, etc., including at least one processor and at least one memory device.

Figure 12:
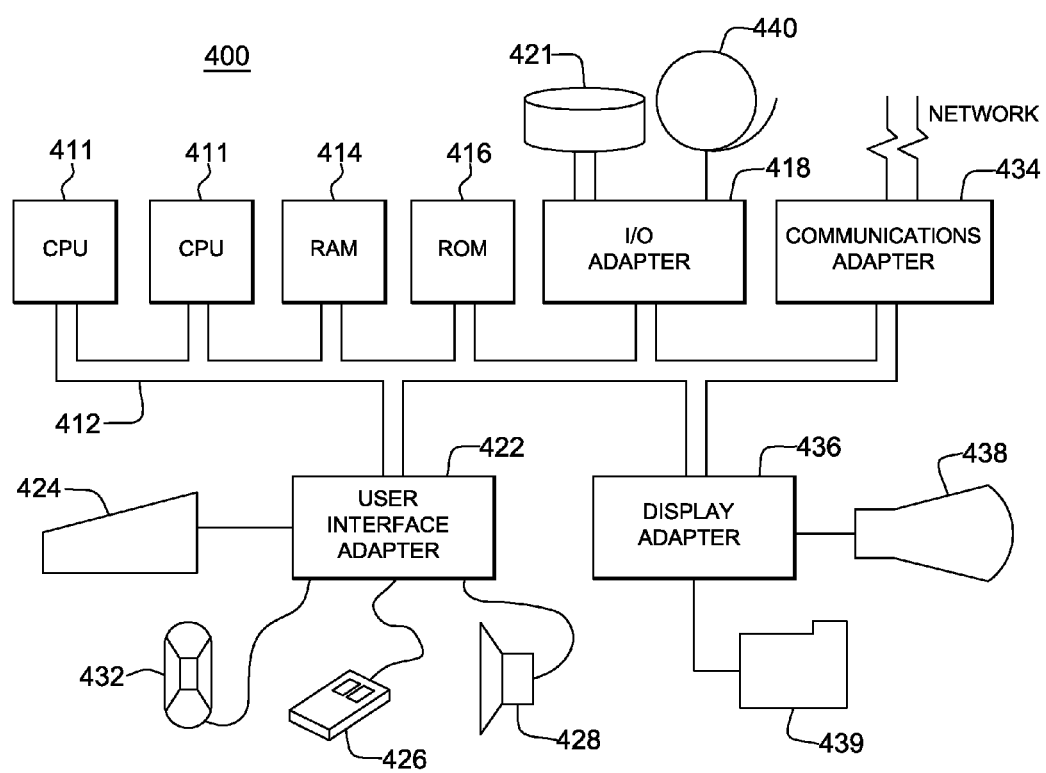
FIG. 12 illustrates one embodiment of an exemplary hardware configuration of a middlebox computing system programmed to implement the methods steps described herein.

The network implementation of FIG. 1 may be configured "In-band" where all traffic flows through the middlebox 16 which intercepts the packets communicated between the sender 12 and receiver 20. The middlebox 16 functions similar to a router in that it sees all packets. In an alternate embodiment (not shown), the network implementation of FIG. 1 may be "Side-band" in which a Router device receives packets and redirects the packets to the middlebox with the redirection via an MAC-layer re-writing (L2) or tunneling (L3). In this embodiment, the middlebox only will only see traffic the router sends to it. In either embodiment, a re-transmission queue or RTX Queue (i.e., a memory) 17 is provided at or associated with the middlebox to save copies of newly arrived packets for re-transmission according to the methods herein. One embodiment of the middlebox device is shown in FIG. 12.

Figure 2:
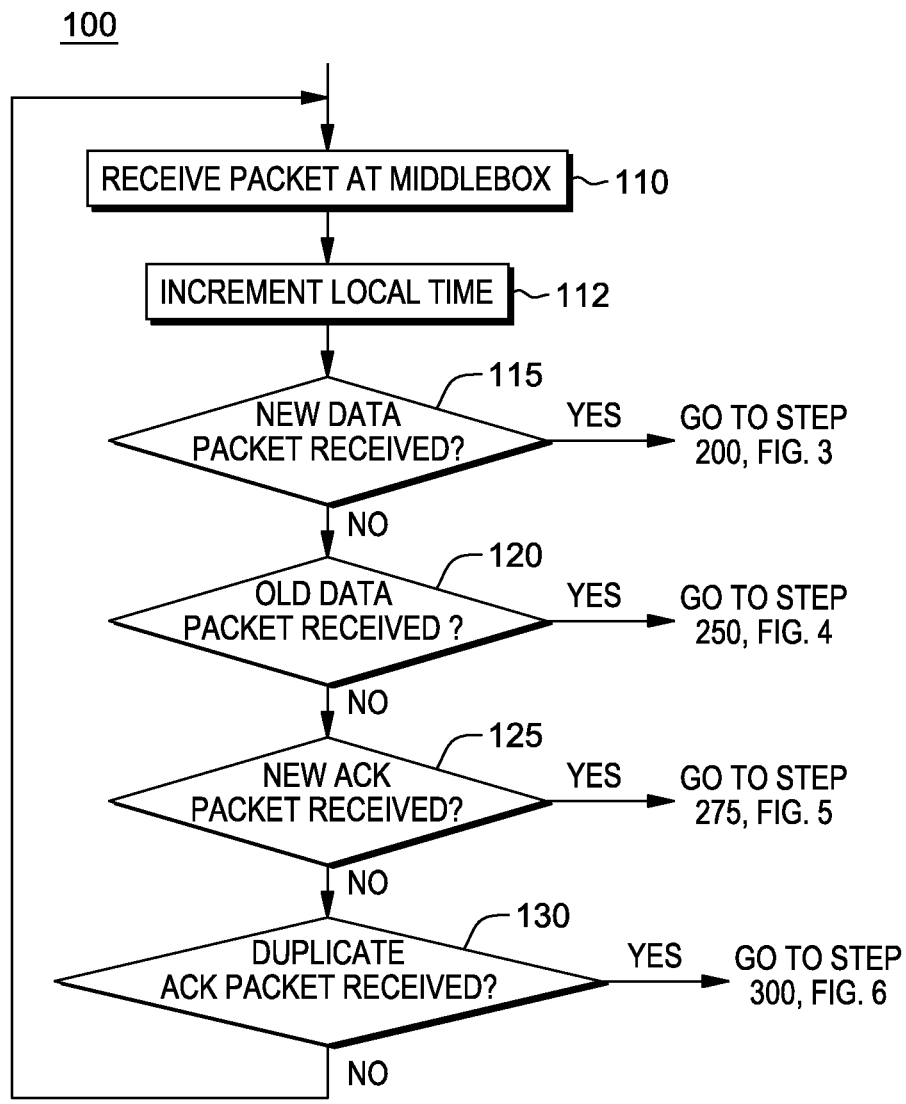
FIG. 2 shows the overall method 100 continuously performed at the middlebox for processing of packets/messages arriving at the middlebox in one embodiment.

FIG. 2 shows the method 100 continuously performed at the middlebox for processing of events, i.e., packets or packet acknowledgements arriving at the middlebox 16. In accordance with the snoop Virtual Receiver Time methods implemented at the middlebox as described herein, there is defined the following:

VT=virtual time=the current "virtual" time on the node/middlebox/sender;

VST=virtual send time=the virtual time (in the past) when the node sent a packet. Each sent packet has a VST associated with it. In one embodiment, a packet's Snoop-VRT's virtual sent time (VST) is initialized to 1, and every time Snoop-VRT method performs some action (sending a packet, receiving a packet, processing a timeout), the VST (is incremented by one); and VRT=virtual receiver time=the virtual time that is known the receiver has gotten to. In one embodiment, a packet's Snoop-VRT's estimate of the virtual receiver time (VRT) is initialized to zero.

Thus, as shown at 110, FIG. 2, the middlebox or network "node" receives a packet. In response, at 112, the middlebox increments the local time, VT, (i.e., the virtual time at the middlebox). Then, a determination is made what kind of packet was received at the middlebox. Thus, at 115, a determination is made whether it is a new data packet received from the sender (source device). If it is a new packet arrival, then processing will continue according to method steps 200 described with respect to FIG. 3. If it is not a new packet arrival, the process proceeds to step 120 to determine if it is an old packet that has arrived, e.g., a packet that is retransmitted from the sender. If an old packet has been received, then processing will continue according to method steps 250 described with respect to FIG. 4. If it is not an arrival of an old packet, the process proceeds to step 125 to determine if the packet received was an ACK packet as sent from the receiver device in accordance with the TCP protocol. If it is a new packet ACK that has been received, then processing will continue according to method steps 275 described with respect to FIG. 5. Otherwise, if the packet received was not an ACK packet, then the process proceeds to 130 to determine if the packet received was a duplicate ACK packet (DUP ACK) as sent from the receiver device in accordance with the snoop TCP protocol. If the packet is a DUP ACK packet that has been received, then processing will continue according to method steps 300 described with respect to FIG. 6.

Figure 3:
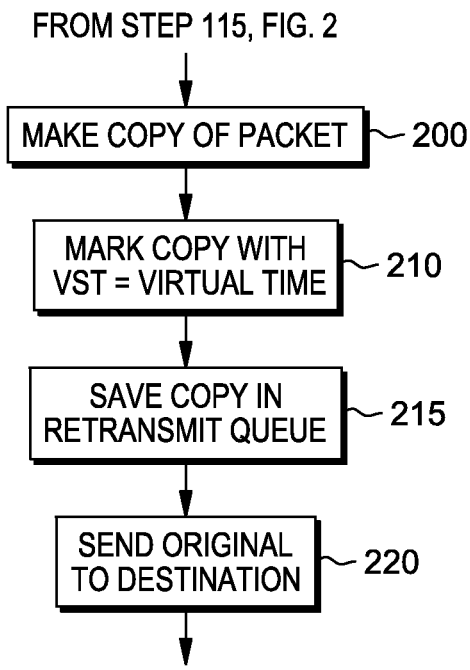
FIG. 3 depicts the method invoked at the middlebox for new packet arrivals according to one embodiment.

Referring now to FIG. 3, the middlebox performs the following method steps for processing when determined that a new packet arrives from the sender. In a first step 200, the middlebox makes a copy of the new arrived packet from the sender and stores it in re-transmission queue. In one embodiment, every time Snoop-VRT sends a packet P to the receiver, it stores the virtual send time (VST) for that packet. Thus, at 210, the method performs: marking the copied packet with a send time (ST) that is equal to the virtual (i.e., current local) time (VT) at the middlebox. At 215, then the middlebox saves a copy of the newly arrived packet in the retransmit (RTX) Queue 17 associated with or located at the middle box 16. After saving a copy of the newly arrived packet at the re-transmit queue, at 220, the middlebox communicates (forwards) the packet, e.g., via the wireless TCP protocol, to the receiver device 20.

Figure 4:
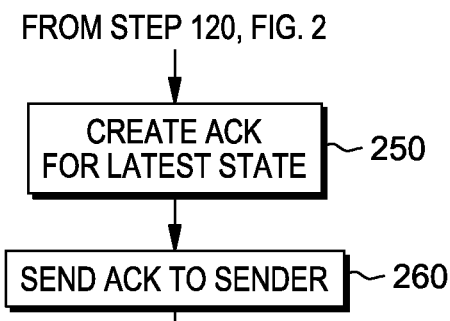
FIG. 4 depicts the method invoked at the middlebox for an arrival of an old packet that has retransmitted from the sender in one embodiment.

Referring to FIG. 4, there is depicted the methods invoked at the middlebox responsive to receiving an old data packet. From step 120, FIG. 2 if an old data packet is received, then at step 250, FIG. 4 the middlebox creates an ACK corresponding to the latest state of the arrived ACK. Then, at 260, the ACK is sent to the sender entity 12 via the network and backbone infrastructure.

Figure 5:
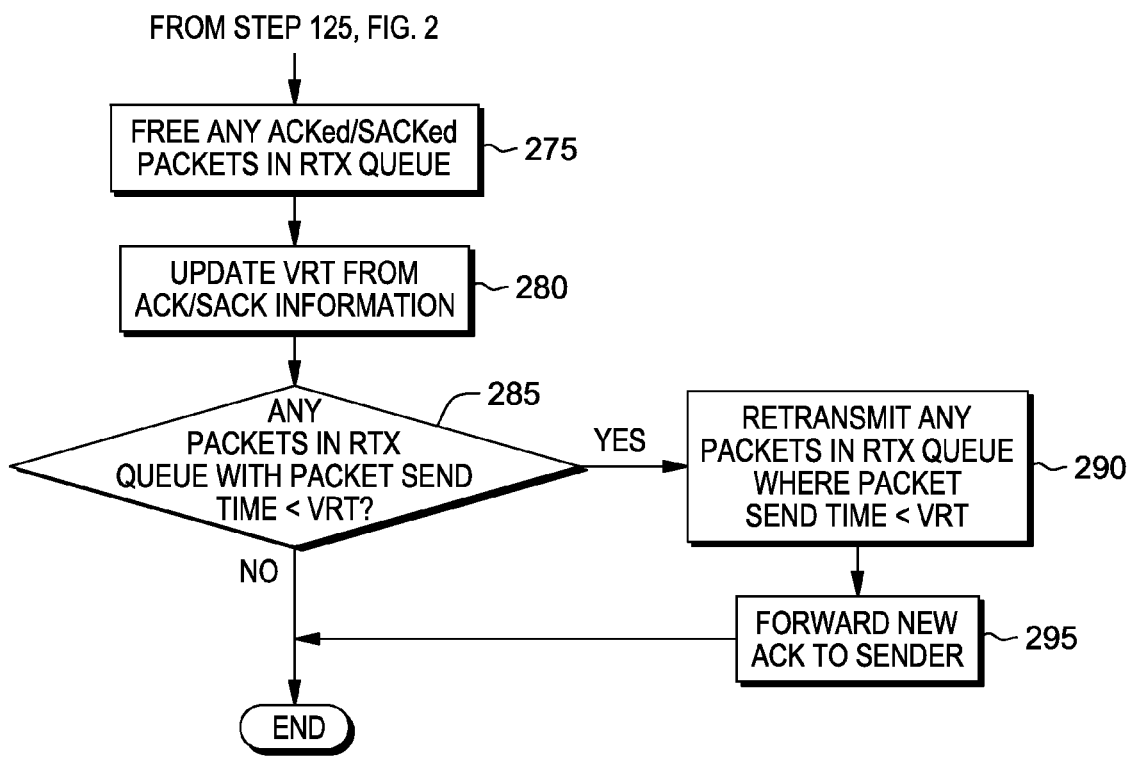
FIG. 5 depicts the method invoked at the middlebox for arrivals of new packet acknowledgements (ACKs) or selective acknowledgements (SACKs) that have been received from a destination device in one embodiment.

Referring to FIG. 5, there is depicted the methods invoked at the middlebox responsive to receiving an ACK for a packet at the middlebox 16. From step 125, FIG. 2 if a new ACK arrives, then at 275, FIG. 5, the middlebox performs freeing any ACKed/SACKed packets in the RTX Queue 17. In one embodiment, this involves looking up the send time for data that has been ACKed. Then, at 280, the method performs updating a Virtual Receiver Time (VRT) from the information in the received ACK/SACK. The estimated receiver time is referred to as virtual receiver time (VRT). Initially, the Snoop-VRT's estimate of the virtual receiver time to zero. If the packet's virtual send time is greater than the VRT, then the VRT is sent to the VST. Then at 285, a determination is made as to whether there are any packets in the RTX (re-transmission) queue and whether there are any packets in RTX Queue where the recorded packet send time <VRT. Thus there is initiated a walk through of the retransmission queue while cleaning it out. For any packets in the RTX queue, if it is determined that the recorded packet virtual send time <VRT, then the method retransmits any packets in the RTX Queue to the receiver 20 at 290 and further, the packet's VST is updated to the current VT. Then, at 295, the middlebox forwards the New ACK packet to the Sender device 12 and the process ends. Otherwise, at 285 if there is no packets in the RTX Queue, or if there are packets in the RTX Queue having a packet send time >VRT, then the process ends.

Figure 6:
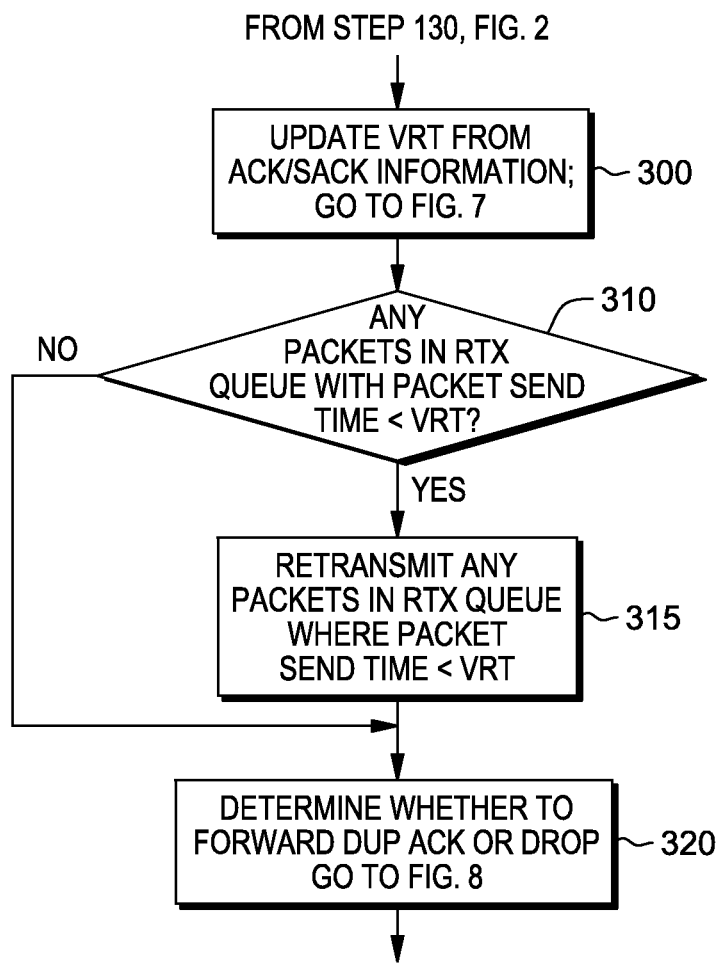
FIG. 6 depicts the method invoked at the middlebox for arrivals of duplicate acknowledgements (DUP ACKs) that have been received from a destination device in one embodiment.

Referring to FIG. 6, there is depicted the methods invoked at the middlebox responsive to receiving a DUP ACK (for a packet) received from the receiver device at the middlebox 16. From step 130, FIG. 2 if a DUP ACK arrives, then a first step 300, FIG. 6, the middlebox performs updating the VRT based on the ACK/SACK information. Details of updating the VRT based on the ACK/SACK information at step 300 will be described with respect to FIG. 7. In one embodiment, there is examined all packets that could potentially be retransmitted and a walk through of the RTX queue is initiated from the start. Whenever Snoop-VRT receives an acknowledgement (ACK) or a SACK block from the receiver for a packet P, it looks up the VST for that packet. Thus, at 310, a determination is made as to whether there are any packets in the RTX (re-transmission) Queue and whether there are any packets in RTX Queue where the recorded packet virtual send time <VRT. If there are no packets in the RTX Queue the process proceeds to step 320 where the middlebox performs determining whether to forward the received DUP ACK as described in detail herein with respect to FIG. 8. For any packets in the RTX queue, if the packet in the queue had been acknowledged, i.e., SACKed, the processing proceeds to step 320. For any packets in the RTX queue, if it is determined that the recorded packet send time <VRT, then the method retransmits any packets in the RTX Queue to the receiver 20 at 315. Further, that packet's VST is updated to the current VT. Otherwise, at 310, if there are packets in the RTX Queue having a packet virtual send time >VRT, then the process proceeds to step 320 as there is not enough information yet, i.e., the Snoop-VRT is still waiting for ACK information.

Continuing at 320, FIG. 6, the method at the middlebox performs determining whether to forward the received DUP ACK to the sender 12 or drop the DUP ACK received from the receiver. Details of method step 320 will be described with respect to FIG. 8.

Figure 7:
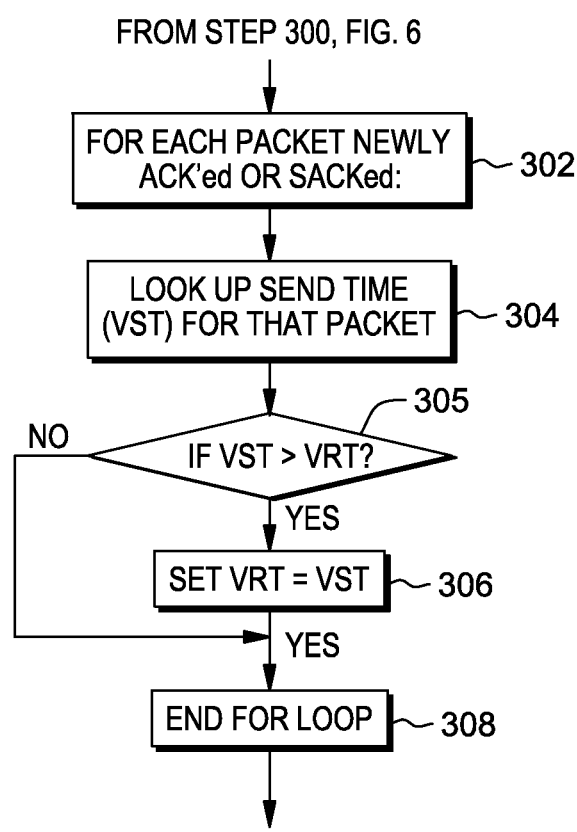
FIG. 7 depicts a method of updating the Virtual Receiver Time (VRT) at the middlebox based on the ACK/SACK information received from the destination device in one embodiment.

Method steps 300 for implementing updating the VRT based on the ACK/SACK information are shown and described as a FOR-END loop in FIG. 7. In FIG. 7, at 302, for each packet received that that was newly ACK'ed or SACKed, a determination is made at 304 of the send time (VST) of that ACK or SACK that was sent by the receiver and received at the middlebox. The virtual send time may be provided as a look-up of the packet header to determine the time that the packet was sent from the receiver device. If the VST is greater than the current estimate of the VRT, the method updates the VRT to the corresponding VST. That is, at 305, a determination is made as to whether the VST is greater that the VRT, i.e., VST>VRT. If, for that ACK, the VST is greater that the VRT of the corresponding packet, then the VRT is updated as the VST, i.e., VRT is set equal to the VST at 306 and the loop ends at 308. If, at 305, it is determined that the VST is not greater than, or equal to the VRT, then the process skips updating the VRT and the for loop ends at 308.

Figure 8:
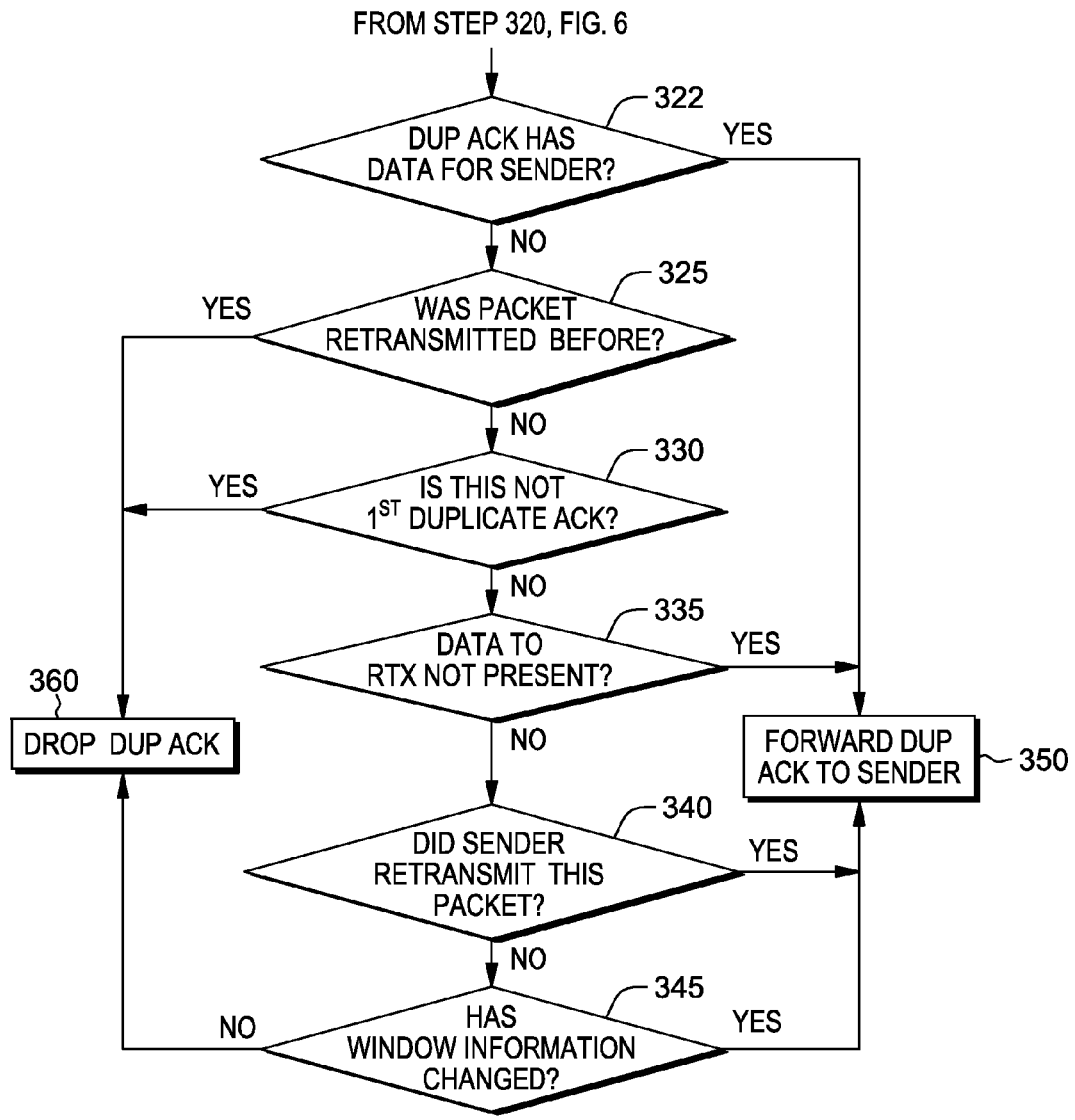
FIG. 8 depicts a method performed at the middlebox for determining whether to forward a received DUP ACK to the sender 12 or drop the DUP ACK received from the receiver in one embodiment.

Method steps 320 for determining whether to forward to the sender or drop the DUP ACK received at the middlebox are shown and described in FIG. 8. In FIG. 8, at 322, a first step is made as to whether the DUP ACK has data for sender. If the DUP ACK has data for sender, then the middlebox forwards the DUP ACK and data to the sender 12. Otherwise, the process proceeds to step 325 where a determination is made as to whether the packet was re-transmitted before. If the corresponding packet was already retransmitted, then the middlebox drops the DUP ACK. Otherwise, the process proceeds to step 330 where a determination is made as to whether the received DUP ACK was not the first duplicate ACK received. If the received DUP ACK was not the first duplicate ACK received, then the middlebox drops the DUP ACK. Otherwise, the process proceeds to step 335 where a determination is made as to whether the data is present at the RTX queue or not. If the data is not present at the RTX queue, then the middlebox forwards the DUP ACK to the sender 12. Otherwise, the process proceeds to step 340 where a determination is made as to whether the sender entity 12 retransmitted the packet corresponding to the DUP ACK. If determined that the sender did retransmit this packet, then the middlebox forwards the DUP ACK to the sender 12. Otherwise, the process proceeds to step 345 where a determination is made as to whether the window information has changed. The window refers to the receive window, which specifies the number of window size units (by default, bytes) (beyond the sequence number in the TCP packet acknowledgment field) that the sender of this segment is currently willing to receive. If determined that the window information has changed, then the middlebox forwards the DUP ACK to the sender 12. Otherwise, at 345, if it is determined that the window size has not changed, then the middlebox drops the received DUP ACK.

Thus, at the middlebox proxy, there is kept track of time in terms of what the receiver has seen in the form of a variable estimated (virtual) receiver time (VRT). This is a monotonically increasing value that represents the causal dependency between sender device 12 and receiver device 20. If the middlebox receives an ACK for a segment (packet) sent at time T, it means receiver is (at least) at time T. In the embodiment, time T always goes forward (VRT=max(T, VRT)). A newer ACK cannot "pass" an older ACK, and the ACK is always for the latest transmission of a segment. In the embodiment, it is assumed that ACKs are never dropped. The max( ) property further prevents any of these virtual time tracking issues.

Figure 11:
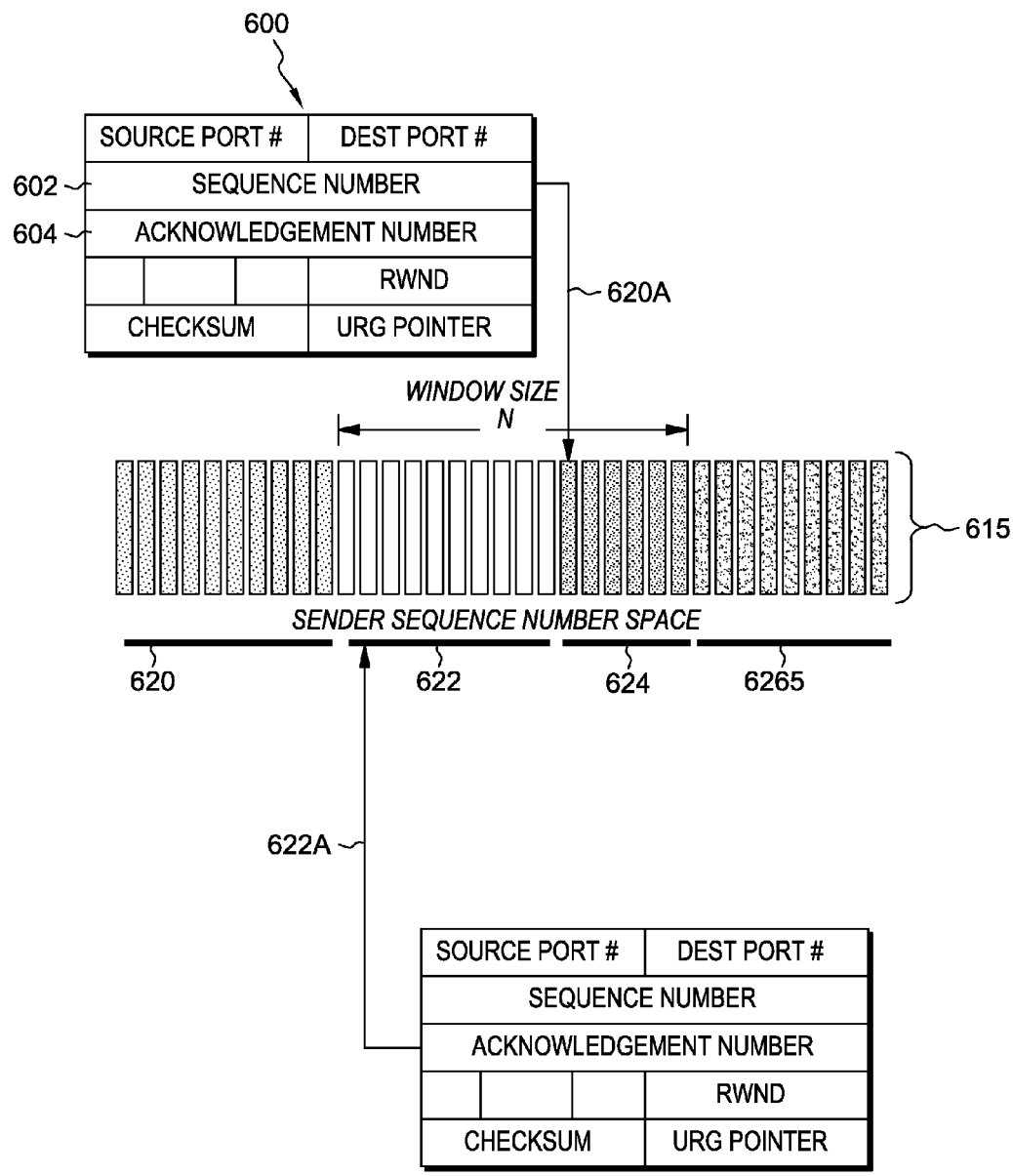
FIG. 11 shows an example portion of a TCP packet header and relevant data used in implementing the method steps of FIGS. 2-8.

FIGS. 9 and 10A-10B illustrate aspects of the snoop-VRT behavior implemented at the middlebox. In the discussion of the methods in the illustrative examples, reference is had to FIG. 11 which depicts a typical TCP header packet 600 of an outgoing packet from a sender and further illustrates a notion of a sequence space. The sequence number field 602 is the byte stream "number" of first byte 620A in the segment's data of an outgoing segment from the sender. The acknowledgements field 604 is a sequence number of a next byte 622A expected from other side, i.e., from an incoming segment received at the sender. In a sender sequence number space 615, bytes 620 show packets that have been cumulatively acknowledged, i.e., packets that have been sent and already ACKed. Bytes indicated as bytes 624 are packets that have been sent, but not-yet ACKed (their status is "in-flight"). The variable "N" is the window size the allowed number of bytes that could be sent, so there remains in this example, the number of remaining bytes 626 that is allowed to be used, i.e., sent, within the window, e.g., if data exists that could be sent. The remaining number of bytes 628 indicates a number of bytes that cannot be sent as beyond the allowable byte window size N. Every TCP packet has these numbers, and the snoop-VRT implementation at the middlebox looks at the sequence number of the packet header, and at the return, looks at the acknowledgement number.

A first example illustrating the method steps of FIGS. 2-8 is now shown with respect to FIG. 9. FIG. 9 shows a sequence of steps 500 performed at the middlebox (PEP) in accordance with the Snoop-VRT methods described herein with packet numbers of a sequences is shown (Y-axis) as a function of time progressing at the top (X-axis). At a time T1-T5: packets (segments) 1-5 of a sequence are sent from the middlebox to the receiver; the times of sending each respective packet 1-5 are written at times they are sent, e.g., T1-T5 respectively. In the example, as shown, it is observed that packets (segments) 2-4 of the sequence are lost. At time T6, shown at 502, FIG. 9, the sending middlebox receives the indication (ACK 1) from the receiver of an acknowledgement for received segment 1 at the receiver, and at T6, at 505, additional receipt of a selective ACK segment 5 (SACK 5) sent from the receiver. It is noted that it may be inferred that from the receipt of SACK 5, the packets 2-4 are lost. In accordance with step 280, FIG. 5, the VRT is set to 5 at the middlebox (indicating when segment 5 was sent). Then, in accordance with step 285, FIG. 5, at a time T7 the middlebox (as proxy for the sender) walks through retransmission queue for retransmitting packets 2-4 assumed lost or dropped. Thus, as packet 2's VST is 2, and it is before 5, packet 2 is retransmitted, and virtual time VT is incremented by one to a time T7. The VST associated with packet 2 is updated to VT (7). Likewise, as packet 3's VST is 3, and it is before 5, packet 3 is retransmitted, and virtual time VT (at the box) is incremented by one to a time T8. The VST associated with packet 3 is updated to VT (8). Likewise, as packet 4's VST is 4, and it is before 5, packet 4 is retransmitted, and virtual time VT (at the box) is incremented by one to a time T9. The VST associated with packet 4 is updated to VT (9). In the example sequence 400 of FIG. 9, it is the case that at time T10, at 510, the middlebox receives a cumulative acknowledgement of packet 5 (ACK 5) from the sender. As receipt of a Cumulative ACK signifies to the middlebox that the receiver has received all data preceding the acknowledged sequence number, then in accordance with step 280, FIG. 5, the VRT is set to T5 at the middlebox (indicating when segment 5 was sent). Then, based on the cumulative acknowledgement received, it is assumed packets 2-4 are received, and in accordance with processing of FIG. 7 steps 305, 306 for updating the VRT for each new packet newly ACKed. Thus, at a time T10 the middlebox (as proxy for the sender) walks through retransmission queue and makes the following determination using the max( ) property. That is, the middlebox determines for newly ACKed packet 2 that the packet 2's send time is 7, which is after VRT 5, and the VRT is set (updated) to max(5,7)==7. Likewise, for newly ACKed packet 3, as packet 3's send time is 8, after 7, then the middlebox updates VRT to max(7,8)==8. Further, for newly ACKed packet 4, as packet 4's send time is 9, which is after time T8, then the middlebox updates VRT to max(8,9)==9. The results of updating the VRT (estimated receiver time) in this example, is consistent with the notion that the VRT should be behind to a current local time.

A second example illustrating behavior of the methods depicted in steps of FIGS. 2-8 is now shown with respect to FIG. 10A-10B. FIG. 10A shows a sequence of steps 600 performed at the middlebox (PEP) in accordance with the Snoop-VRT methods described herein with packet numbers of a sequences is shown (Y-axis) as a function of time progressing at the top (X-axis). At a time T1-T5: packets (segments) 1-5 of a sequence are sent from the middlebox to the receiver; the times of sending each respective packet 1-5 are written at times they are sent, e.g., T1-T5 respectively. In the example, it is observed that packet 2 and packet 4 of the sequence are lost. At time T6, indicated at 602, FIG. 10, the sending middlebox receives the indication (ACK 1) from the receiver of an acknowledgement for the received segment 1 at the receiver. In accordance with step 280, FIG. 5, the VRT is set to 1 at the middlebox (indicating when packet 1 was sent). Then, in accordance with step 285, FIG. 5, at a time T6, the middlebox (as proxy for the sender) walks through retransmission queue to compare their virtual send time with the virtual receiver time VRT to determine if any packets are to be retransmitted. Thus, for packet 2, as the packet 2 VST (send time) is 2, which is after VRT 1, nothing is done. For packet 3, as the packet 3 VST (send time) is 3, which is after VRT 1, nothing is done. For sent packet 4, as the packet 4 VST (send time) is 4, which is after VRT 1, nothing is done. Then in the example, at time T8, it is shown that the middlebox receives a DUP ACK for packet 1, and at 605, receives a selective acknowledgement for packet 3 (SACK 3). Thus, in accordance with processing at step 20, FIG. 5, the middlebox walks through SACK block, and updates the VRT to time 3. Then, the middlebox walks through retransmission queue and compares the VST with the VRT. That is, the middlebox determines for packet 2 that the packet 2's send time is 2, which is less than the VRT 3, and in accordance with step 290, FIG. 5, the middlebox retransmits the packet 2 at time T9 as indicated at 610, and sets its VST to its send time (T9). As segment 5 virtual send time (VST) is 5, which is after the VRT 3, the middlebox does nothing with respect to packet 5.

FIG. 10B shows a continuing sequence of Snoop-VRT method steps 650 performed at the middlebox (PEP) in furtherance of the example 600 depicted in FIG. 10A. However, in the example of FIG. 10B, it is assumed packet 2 sent at time T9 is lost. As shown at 652 methods, at VT time T10, the middlebox is shown receiving an ACK 1 and receiving a selective ACK (SACK) for each of packets 3, 5 (in which case it is known that the receiver gets to VRT time T5). Then, in accordance with the method of FIG. 7, the packet 5 SACK block (SACK 5) is reviewed and it is determined to update the VRT to 5 which was the VST when packet 5 was sent. Then, in accordance with steps 285, 290 FIG. 5, the middlebox walks through the retransmission queue: and compares the VST of the packets with the current VRT. For packet 2 having a send time of time T9, since this is after the VRT of 5, no action is taken. For packet S4, as the packet send time (VST) is 4, which before 5, packet 4 is retransmitted at time T11, and its new sent time VST is updated to 11. It is not known what happened to new packet 2 as it was already retransmitted at time T9. Then continuing at 652, at time T12 there is shown a receipt at the middlebox of an ACK for act 1 (e.g., DUP ACK 1), and a SACK for each of packets 3, 4 and 5. To update the VRT, the middlebox walks through SACK blocks, and at 655, given receipt of new SACK corresponding to packet 4, the middlebox updates the VRT to 11 which was the VST of packet 4 indicating when packet 4 was sent. Then, walking through the retransmission queue, as packet 2's send time was T9 which is before the VRT 11, then this packet 2 is retransmitted, at time T13, and the VST for packet 2 is updated to a new send time T13.

Referring to FIG. 12 illustrates one embodiment of an exemplary hardware configuration of a computing system 400 programmed to perform the method steps at the performance enhancing proxy (PEP) described herein with respect to FIGS. 1-8. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

In an embodiment, the middlebox PEP 16 can be a server. The PEP 16 can be implemented as, for example, but is not limited to, a WAN accelerator, a web cache, and a network optimizer appliance/WIFI Accelerator (NOA/WAX).

Of course, the PEP 16 may also include other elements (not shown), as readily contemplated by one of skill in the art, as well as omit certain elements. For example, various other input devices and/or output devices can be included in PEP 16, depending upon the particular implementation of the same, as readily understood by one of ordinary skill in the art. For example, various types of wireless and/or wired input and/or output devices can be used. Further, in some embodiments, user direct input devices can be omitted, with user inputs provided remotely through one or both of the network adapters 422 and 434. Moreover, additional processors, controllers, and memories embodying the retransmission queue for example, in various configurations can also be utilized as readily appreciated by one of ordinary skill in the art. These and other variations of PEP 16 are readily contemplated by one of ordinary skill in the art given the teachings of the present principles provided herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A snoop receiver apparatus for a communications network having a source device and a receiver device, wherein said source device sends a plurality of packets to said receiver device through the snoop receiver apparatus, said apparatus comprising:
    a processor device and an associated memory, said processor device configured to:
    receive the plurality of packets from the source device;
    maintain a copy of each of said received plurality of packets, said copy of the received plurality of packets adapted for transmission to said receiver device on behalf of said source device;
    maintain a virtual send time (VST) of each of the plurality of packets, each said VST corresponding to a time at which a respective packet of the plurality of packets has been sent to said receiver device;
    receive a first acknowledgement (ACK) message corresponding to a first packet of the plurality of packets from the receiver device; and
    set a virtual receive time based on the first ACK message received from the receiver device,
    wherein said processor device is configured to determine that one or more packets of the plurality of packets are lost when each of the VSTs of said one or more packets is less than the set virtual receive time, and retransmit a copy of said one or more packets to the receiver device,
    wherein the processor device is further configured to:
    receive a second ACK message corresponding to a second packet of the plurality of packets from the receiver device; and
    when the corresponding VST of the second packet is greater than the virtual receive time set based on the first ACK message, update the virtual receive time to the corresponding VST of the second packet.

2. The apparatus according to claim 1, wherein to maintain said VST for each of the received plurality of packets, said processor device is configured to:
    record a virtual time (VT) value for association with each of the copied plurality of packets in a memory storage queue.

3. The apparatus according to claim 2, wherein to maintain, said VST for each of the received plurality of packets, said processor device is configured to:
    initialize said virtual time (VT) value to 1; and
    responsive to each of the received plurality of packets, increase said VT value by one.

4. The apparatus according to claim 1, wherein the second ACK message includes a cumulative ACK message corresponding to a third packet of the plurality of packets, said processor device is further configured to:
    determine said VST of the third packet;
    determine whether the VST of the third packet is greater than the virtual receive time set based on the first ACK message, and
    when said VST of the third packet is greater than the virtual receive time set based on the first ACK message, set the virtual receive time to the VST of the third packet.

5. The apparatus according to claim 4, wherein said processor device is further configured to: when a third ACK message corresponding to a fourth packet of the plurality of packets is received from the receiver device,
    access said memory storage queue, and for the copy of the fourth packet maintained therein: and
    set said virtual receive time to the VST of the fourth packet when said VST of the fourth packet is greater than said virtual receive time set with the VST of the third packet.

6. The apparatus according to claim 1, wherein the second ACK message includes a selective ACK (SACK) message corresponding to a fifth packet of the plurality of packets, said processor device is further configured to:
    determine, based on the SACK message, the VST of the fifth packet; and
    set said virtual receive time to the VST of the fifth packet when said VST of the fifth packet is greater than said virtual receive time set based on the first ACK message.

7. The apparatus according to claim 1, wherein the second ACK message includes a duplicate ACK (DUP ACK) message corresponding to a sixth packet of the plurality of packets, said processor device is further configured to:
    access said memory storage queue and for the copy of the fifth packet maintained therein:
    determine whether the VST of the sixth packet is greater than said virtual receive time set based on the first ACK message, and
    not take any action when the VST of the sixth packet is greater than said virtual receive time set based on the first ACK message.

8. The apparatus according to claim 1, wherein the second acknowledgement (ACK) message includes a duplicate ACK (DUP ACK) message corresponding to a seventh packet of the plurality of packets, said processor device is further configured to:
    access said memory storage queue and for the copy of the seventh packet maintained therein:
    determine whether the VST of the seventh packet is less than said virtual receive time set based on the first ACK message; and
    retransmit said seventh packet when said VST of said seventh packet is less than said virtual receive time set based on the first ACK message; and
    set said VST of said seventh packet to a time at which the seventh packet has been retransmitted.

9. A computer program product for communicating a plurality of packets in a network having a source device that sends packets to a receiver device through an apparatus, the computer program product comprising a computer readable storage medium, the computer readable storage medium not a propagating signal, the computer readable storage medium readable by a processing circuit and storing instructions run by the processing circuit for performing a method comprising:
    receiving the plurality of packets from the source device;
    maintaining a copy of each of said received plurality of packets, said copy of the received plurality of packet adapted for transmission to said receiver device on behalf of said source device;
    maintaining a virtual send time (VST) of each of the plurality of packets, each said VST corresponding to a virtual time at which a respective packet of the plurality of packets has been sent to said receiver device;
    receiving a first acknowledgement (ACK) message corresponding to a first packet of the plurality of packets from the receiver device;
    setting a virtual receive time based on the first ACK message received from the receiver device;
    determining one or more packets of the plurality of packets are lost when each of the VSTs of said one or more packets is less than the set virtual receive time; and retransmitting a copy of said one or more packets to the receiver device, wherein the method further includes:

receiving a second ACK message corresponding to a second packet of the plurality of packets from the receiver device; and when a corresponding VST of the second packet is greater than the set virtual receive time, updating the virtual receive time to the corresponding VST of the second packet.

* * * * *